United States Patent [19]

Parl et al.

[11] Patent Number: 4,893,128

[45] Date of Patent: Jan. 9, 1990

[54] TROPOSCATTER DIVERSITY SIDELOBE JAMMING SUPPRESSOR

[75] Inventors: Steen A. Parl, Cambridge; John N. Pierce, Lexington, both of Mass.

[73] Assignee: The United States of America as represented by the Secretary of the Air Force, Washington, D.C.

[21] Appl. No.: 97,589

[22] Filed: Nov. 29, 1979

[51] Int. Cl.⁴ .................... G01S 3/16; H04B 1/10
[52] U.S. Cl. .................... 342/379; 342/384;
342/381; 342/16; 455/278; 455/284
[58] Field of Search .............. 455/278, 283, 284;
343/100 LE, 18 E; 342/16, 379, 381, 384

[56] References Cited

U.S. PATENT DOCUMENTS

| 3,202,990 | 8/1965 | Howells | 343/100 LE |
|---|---|---|---|
| 3,290,684 | 12/1966 | Renn et al. | 343/100 LE |
| 3,881,177 | 4/1975 | Len et al. | 343/100 LE |
| 3,900,874 | 8/1975 | Larkin et al. | 343/100 LE |
| 3,938,153 | 2/1976 | Lewis et al. | 343/100 LE |
| 3,943,511 | 3/1976 | Evans et al. | 343/100 LE |
| 4,010,469 | 3/1977 | Marcum | 343/100 LE |
| 4,021,805 | 5/1977 | Effinger et al. | 343/100 LE |
| 4,044,359 | 8/1977 | Applebaum et al. | 343/100 LE |
| 4,075,566 | 2/1978 | D'Arcangelis | 455/284 |
| 4,075,633 | 2/1978 | Lewis | 343/100 LE |
| 4,096,480 | 6/1968 | Miner et al. | |
| 4,320,535 | 3/1982 | Brady et al. | 485/278 |
| 4,628,320 | 12/1986 | Downie | 342/379 |

OTHER PUBLICATIONS

C. L. Zahn, IEEE Transactions on Aerospace & Electronic Systems, vol. AES-9, No . 2, Mar. 1973.

Primary Examiner—Stephen C. Buczinski
Attorney, Agent, or Firm—Jacob N. Erlich; Donald J. Singer

[57] ABSTRACT

Sidelobe jamming in dual diversity troposcatter link receivers is effectively suppressed by providing an auxilliary low power antenna, the output of which is differenced from the high power main antenna signals prior to processing in the receivers's dual diversity demodulator. The auxilliary antenna power is substantially equal to the sidelobe power of the main antennas. The auxilliary antenna receives jamming power that is comparable to the jamming power received by the main antennas. However, it receives much lower desired signal power. Differencing of the signals therefore, cancels jamming power with minimal effect on the desired signals.

3 Claims, 5 Drawing Sheets

TROPOSCATTER DIVERSITY SIDELOBE JAMMING SUPPRESSOR

STATEMENT OF GOVERNMENT INTEREST

The invention described herein may be manufactured and used by or for the Government for governmental purposes without the payment of any royalty thereon.

BACKGROUND OF THE INVENTION

In a typical dual-diversity troposcatter link the desired signal is received on two high gain (typically 38 to 40 dB gain) antennas. The amplitudes of these signals exhibit independent fading, and a diversity combiner forms an output that exhibits loss of SNR less frequently than on either antenna separately. The average troposcatter signal strength is always quite weak, however, and it is possible for a jammer within line-of-sight of the antennas to produce interference through the sidelobes of the antennas even though the sidelobe gain of the antennas is typically at least 20 dB lower than the main lobe gain.

The purpose of the present invention is to provide sidelobe jamming suppression in troposcatter sets of this type and to do so with an implementation that is applicable to all tactical and strategic troposcatter receiving terminals. The invention avoids the accidental suppression of the desired signal during quiet intervals of intermittent jamming even in the presence of signal fading whereas conventional sidelobe cancellers are suitable only for use with steady jamming and constant strength of desired signal.

SUMMARY OF THE INVENTION

The invention comprehends a sidelobe jamming suppressor for a troposcatter receiver and includes an auxiliary low gain disk or horn antenna whose gain is comparable to the sidelobe gain of the main antenna of a dual diversity troposcatter receiver. The auxiliary antenna's output is amplified and down-converted to IF, then applied to a jamming suppression processor together with IF signals received by the main antenna. Jamming from the main antenna signal is removed by the processor and resultant unjammed signals are passed to a dual diversity demodulator. The suppression processor includes a combination of attenuators, amplifiers, clippers, adjustable low pass filters, and balanced PIN diode multipliers arranged in a feedback loop and adjusted so as to maximize jamming suppression without loss of the desired signal when jamming is absent or intermittent.

It is a principal object of the invention to provide a new and improved troposcatter diversity sidelobe jamming suppressor.

It is another object of the invention to provide a troposcatter diversity sidelobe suppressor of the type described that is suitable to use in all tactical and strategic troposcatter receiving terminals.

It is another object of the invention to provide a troposcatter diversity sidelobe jamming suppressor that avoids accidental suppression of the desired signal during quiet intervals of intermittent jamming.

These together with other object, features and advantages of the invention will become more readily apparent from the following detailed description taken in conjunction with the illustrative embodiment in the accompanying drawings.

DETAILED DESCRIPTION OF THE PREFERRED EMBODIMENT

Figure 1:
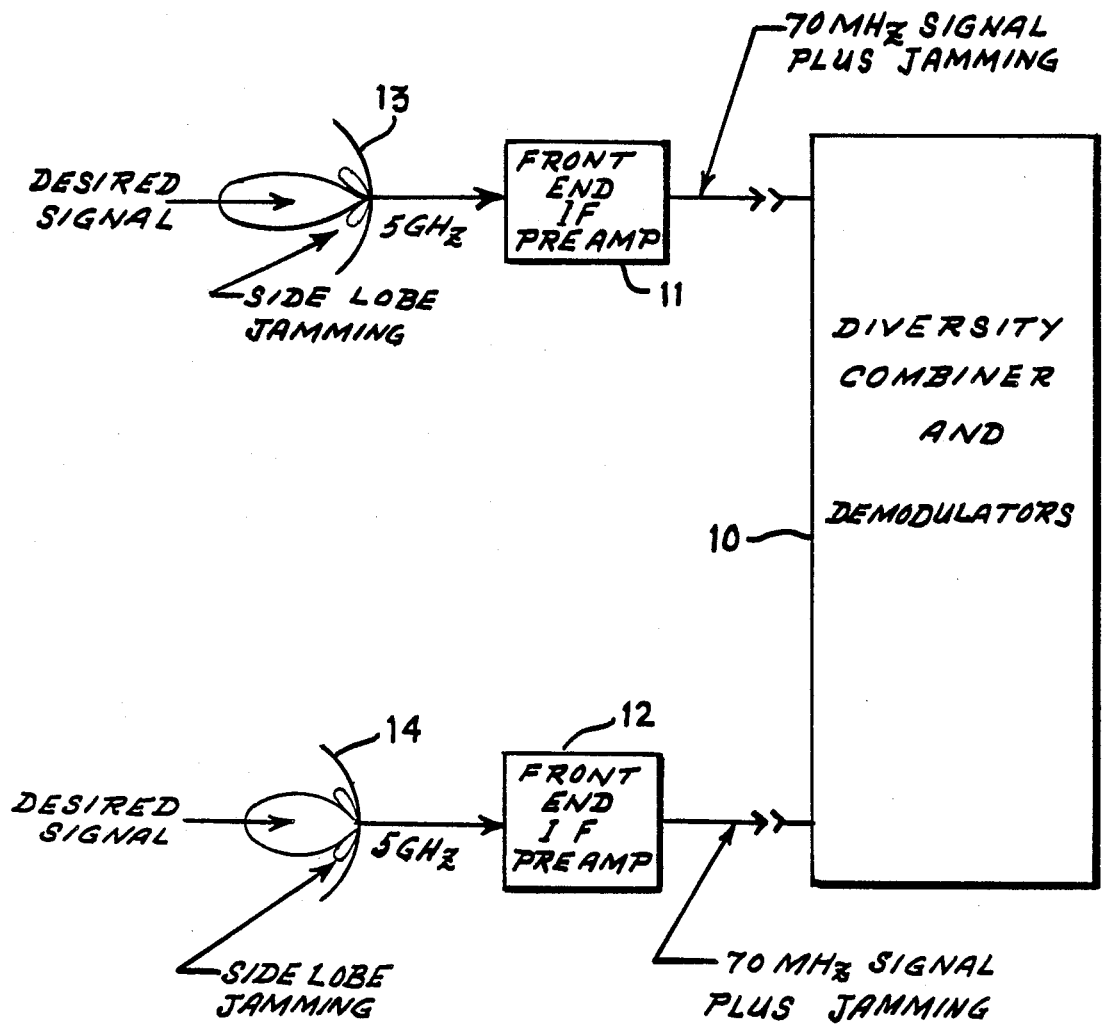
FIG. 1 is a block diagram of a conventional dual diversity troposcatter receiver.

A typical state of the art dual diversity troposcatter link is illustrated by the block diagram of FIG. 1. It comprises main antennas 13, 14, front end IF preamplifiers 11, 12 and diversity combiner and demodulator circuit 10.

Figure 2:
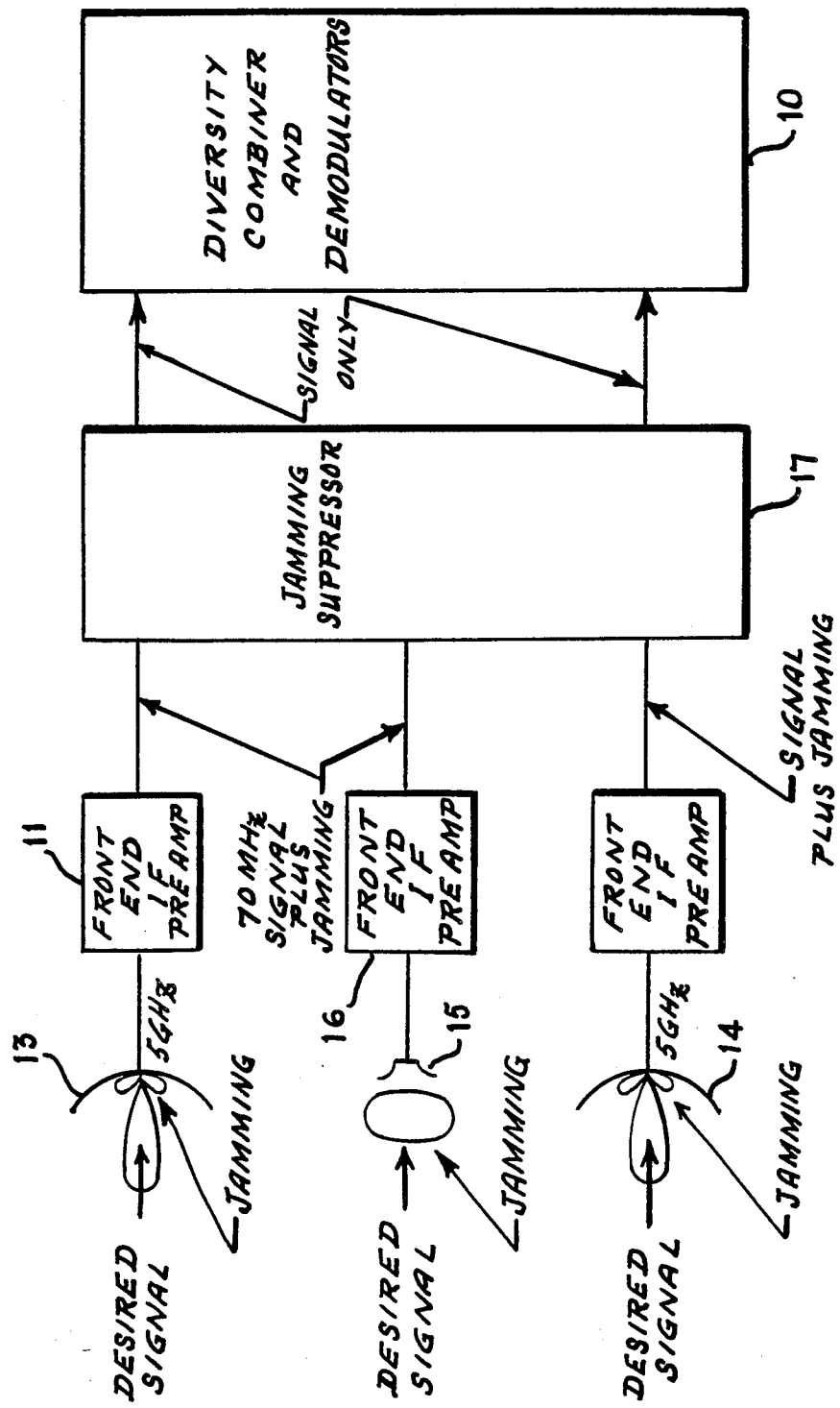
FIG. 2 is a block diagram of a dual diversity troposcatter receiver incorporating the sidelobe jamming suppressor of the invention.

FIG. 2 illustrates the application of the sidelobe canceller of the invention to the troposcatter receiver of FIG. 1. An auxiliary low gain antenna 15 is used whose gain is comparable to the sidelobe gain of the main antennas 13, 14. This auxiliary antenna receives a jamming power level as large or larger than the jamming power received on the main antenna. It also receives some of the desired signal, but at an average power level that is 20 dB below the signal level on the main antennas. This auxiliary antenna output is amplified and down-converted to IF (typically 70 MHz) by front end IF preamplifier 16. The auxiliary and main IF signals are fed to the jamming suppression processor 17 which removes most of the jamming from the main antenna signals with minor loss of power in the desired signal. These cleaned-up copies of the signal waveforms are passed to the dual diversity demodulator 10 of the radio which operates exactly as it would on unjammed signals without the processor.

Figure 3:
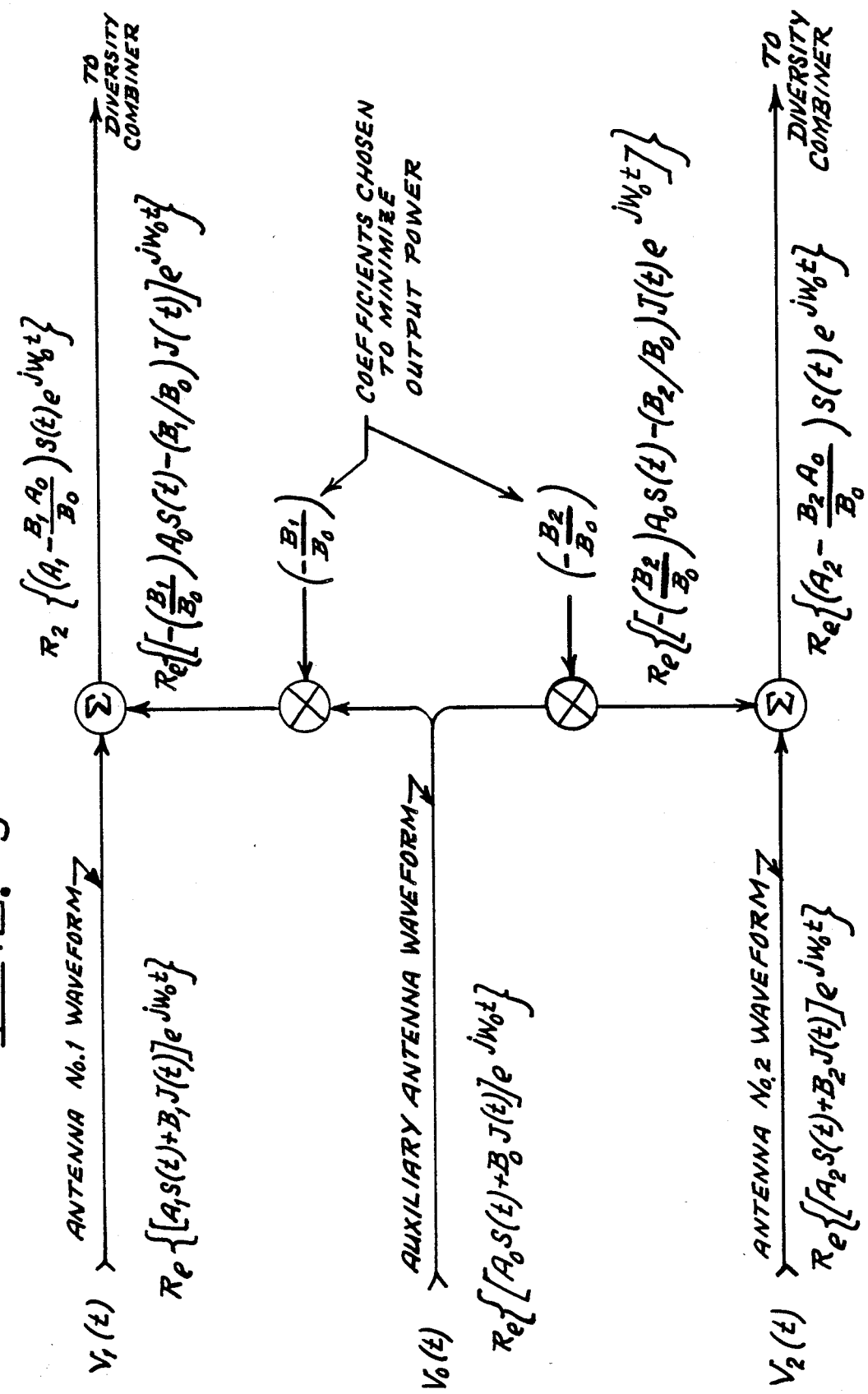
FIG. 3 is a mathematical description of the desired operation of the sidelobe jamming suppressor of the invention.

FIG. 3 shows in basic form the desired mathematical behavior of the jamming suppression processor. The notation on the figure is virtually self-explanatory. $S(t)$ $e^{j\omega_o t}$ and $J(t)$ $e^{j\omega_o t}$ are the complex fields as seen by omnidirectional antennas. The total signal on main antenna #1 is therefore of the form $$v_1(t) = [A_1 S(t) + B_1 J(t)]e^{j\omega_o t}.$$

On the average the coefficient $A_1$ will have a magnitude of 100, corresponding to the typical antenna gain of 40 dB; at times the coefficient $A_1$ will be much smaller because of signal fading. The coefficient $B_1$ may have a magnitude as large as 10 corresponding to a peak sidelobe gain of 20 dB, which is 20 dB less than the mainlobe gain. On the auxiliary antenna the gain is relatively constant over a wide range of azimuth angles, and $A_0$ and $B_0$ will typically have a magnitude of 10.

The desired operation of the suppression circuit is to subtract an appropriate multiple of $v_0(t)$ from $v_1(t)$ to cancel the jamming. As shown on FIG. 3 this results in the signal output being changed to $$\left(A_1 - \frac{B_1}{B_0} A_0\right) S(t)$$

which can also be written as $$\left(1 - \frac{B_1}{B_0} \frac{A_0}{A_1}\right) A_1 S(t).$$

The factor $$\eta = \left(1 - \frac{B_1}{B_0} \frac{A_0}{A_1}\right)$$

is the reduction in signal voltage caused by suppression of the jamming. Its magnitude depends on the relative phases and amplitudes of the four gain coefficients; under some circumstances the signal level may be enhanced. A lower bound on $\eta$ is provided by the expression $$\eta > \eta_{min} = 1 - \frac{|B_1|}{|B_0|} \cdot \frac{|A_0|}{|A_1|}.$$

For the typical values of $$|B_1| \approx |B_0| \approx 10,$$

$$|A_0| \approx 10, \, |A_1| \approx 100,$$

we have $$\eta_{min} \approx 0.9$$

representing a 1 dB power loss in the desired signal.

Figure 4:
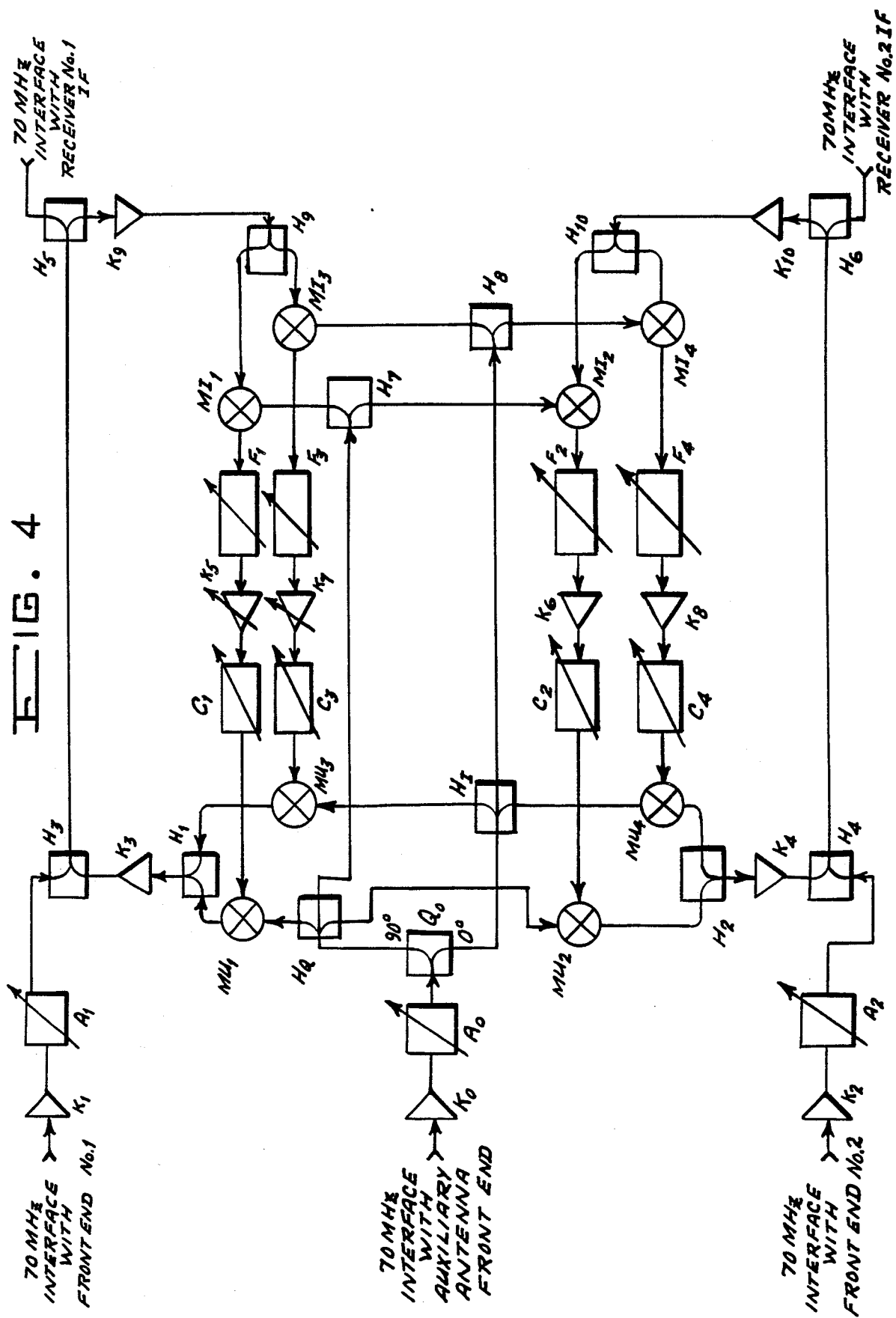
FIG. 4 is a circuit diagram of one detailed implementation of the invention.

FIG. 4 is a detailed implementation of the jamming suppression processor 17. It comprises input amplifiers $K_0$, $K_1$, $K_2$, variable attenuators $A_0$, $A_1$, $A_2$ ($A_1$ and $A_2$ being ganged), quadrature hybrids $Q_0$, $H_Q$, $H_1$ three way hybrids $H_1$–$H_{10}$, balanced pin diode multipliers $MU_1$–$MU_4$, amplifiers $K_3$, $K_4$, clippers $C_1$–$C_4$, DC amplifiers $K_5$–$K_8$, adjustable low pass filters $F_1$–$F_4$, mixers $MI$–$MI_4$, and limiting amplifiers $K_9$–$K_{10}$ in the circuit arrangement shown. Clippers $C_1$–$C_4$, low pass filters $F_1$–$F_4$ and DC amplifiers $K_5$–$K_8$ are also ganged. The specific location of some of the amplifiers and attenuator is not critical, but is determined on an ad hoc basis to achieve good linearity and SNR; extra amplifiers may be included in the IF paths or DC paths as long as phase tracking of the IF paths is maintained. The feedback implementation shown in the figure acts in such a way as to minimize the output power of each of the diversity branches; the attenuators $A_1$ through $A_3$ (which act as gain controls) are set in accordance with a gain control logic in conjunction with the clippers $C_1$ through $C_4$ in such a way as to provide maximum jamming suppression consistent with minimizing the loss of desired signal when the jamming is absent or intermittent.

Figure 5:
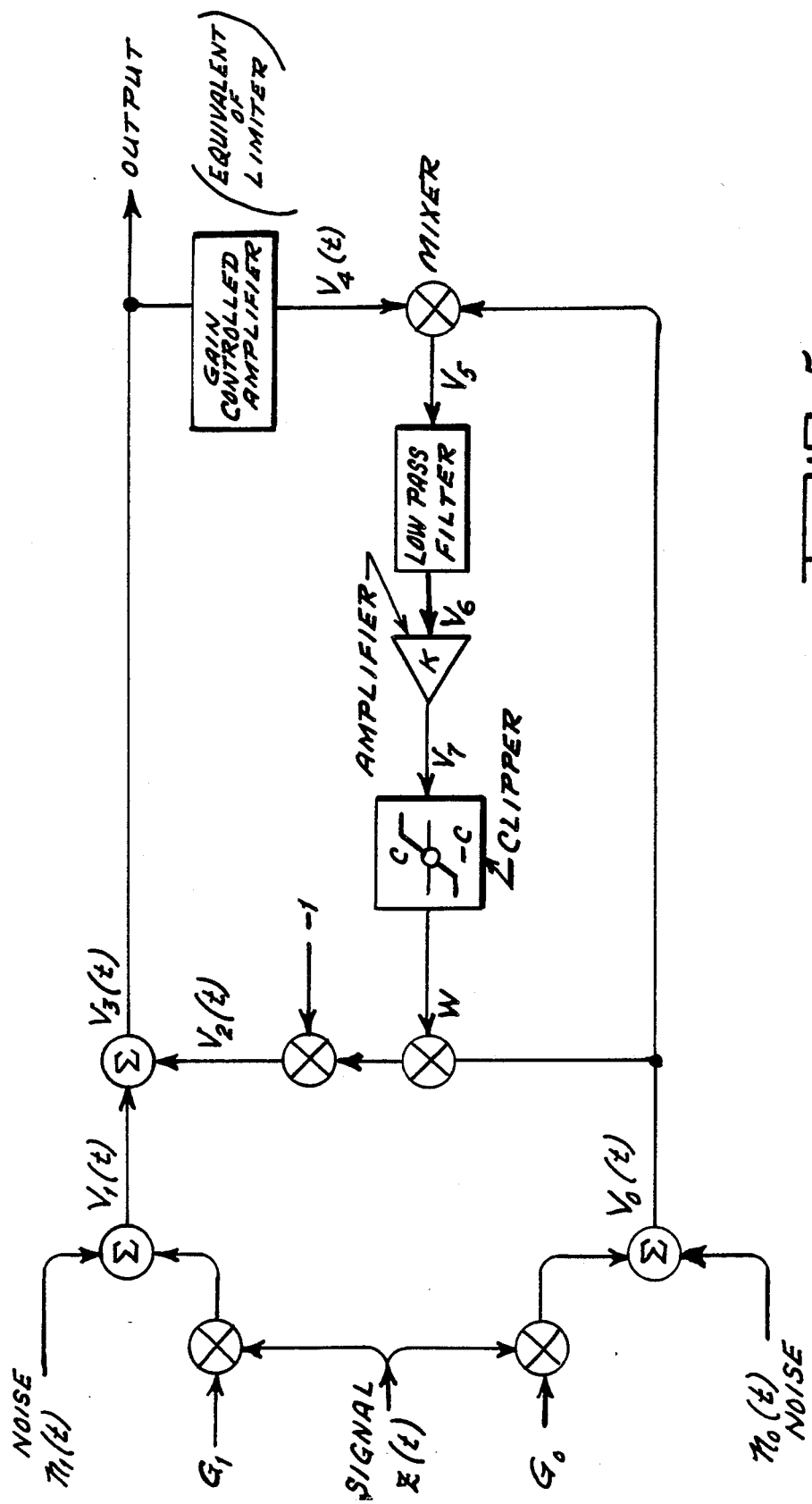
FIG. 5 schematically illustrates a low pass equivalent of one diversity branch and one quadrature component of the implementation of FIG. 4.

The principle of operation may be understood by an inspection of FIG. 5 which is an approximate low-pass equivalent of one quadrature component of the suppression circuit for one diversity branch. The waveform $z(t)$ is equivalent to a single signal impinging on the antennas and $G_0$ and $G_1$ are the relative gains to $z(t)$ experienced on the auxiliary and main antennas respectively.

The noise waveforms $n_0(t)$ and $n_1(t)$ can be pictured as waveforms that have unit power and are uncorrelated with each other. The power level in $G_1 z(t)$ is assumed to be much larger than unity. From FIG. 5 and the notation thereon it can then be seen that the waveforms at other places in the circuit are given by $$\begin{aligned}
v_0(t) &= G_0 z(t) + n_0(t) \\
v_1(t) &= G_1 z(t) + n_1(t) \\
v_2(t) &= -w \, v_0(t) \\
&= -w \, G_0 z(t) - w \, n_0(t) \\
v_3(t) &= v_1(t) + v_2(t) \\
&= (G_1 - w G_0) z(t) + n_1(t) - w n_0(t)
\end{aligned}$$

The hard limiter can be modeled as a gain controlled amplifier: let $P_z$ be the power in $z(t)$, so that the signal component of $v_3(t)$ has a power level $$P_s = (G_1 - w G_0)^2 P_z;$$

the power in the two uncorrelated noise components of $v_3(t)$ is 1 and $w^2$ respectively. The total power in $v_3$ is therefore $$P_3 = (G_1 - w G_0)^2 P_z + 1 + w^2.$$

The limiter is then modeled as an amplifier with a voltage gain of $P_3^{-\frac{1}{2}}$, and its output is approximated by $$\begin{aligned}
v_4(t) &= P_3^{-1/2} v_3(t) \\
&= P_3^{-1/2}(G_1 - w G_0) z(t) + P_3^{1/2} n_1(t) - P_3^{1/2} w n_0(t)
\end{aligned}$$

The output of the mixer is the product $$\begin{aligned}
v_5(t) &= v_0(t) v_4(t) \\
&= P_3^{-1/2}(G_0 G_1 - w G_0^2) z^2(t) - \\
&\quad P_3^{-1/2} w n_0^2(t) + \\
&\quad \text{cross products containing terms} \\
&\quad \text{proportional to } z(t) n_0, \\
&\quad z(t) n_1(t), \text{ and } n_0(t) n_1(t).
\end{aligned}$$

The lowpass filter for the purpose of steady state analysis may be treated as forming the time average of $v_5(t)$ $$v_6 = \text{Ave}[v_5(t)],$$

The average values of the three types of crossproduct terms are zero because the componenets of the crossproduct are uncorrelated; the two remaining terms containt the averages $$\text{Ave}[z^2(t)] = P_z$$

and $$\text{Ave}[n_0^2(t)] = 1.$$

It thus follows that $$v_6 = P_3^{-\frac{1}{2}}(G_O G_1 - w G_0^2) P_z - P_3^{-\frac{1}{2}} w.$$

The amplifier output is $$v_7 = Kv_6$$
$$= KP_3^{-1/2} [(G_0G_1 - wG_0^{-2}) P_z = w].$$

The clipper yields an output $$w = \begin{cases} v_7 \text{ if } |v_7| \leq c \\ c\, v_7/|v_7| \text{ if } |v_7| \geq c \end{cases}$$

where c is clipping level.

Two cases of operation may be considered. If $|v_7| < c$ then w is equal to $v_7$ $$w = v_7 \text{ if } |v_7| \leq c.$$

In this case it follows that $$w = KP_3^{-\frac{1}{2}}[(G_0G_1 - wG_0^2)P_z - w]$$

or, upon substituting the value of $P_3$, $$W = \frac{K[(G_0G_1 - wG_0^2) P_z - w]}{[(G_1 - wG_0)^2 P_z + 1 + w^2\, ^{-1/2}]}.$$

It is convenient to write w as $$w = G_1/G_0 - x$$

so that the equation for w may be paraphrased as $$G_1/G_0 - x = \frac{K[G_0^2 \times P_z - G_1/G_0 + x]}{x^2 P_z + 1 + (G_1/G_0 - x)^2]^{1/2}}.$$

It is easily verified that if $G_0^2 P_z$ is large, then x is quite small and the denominator of the right hand side of the above equation is approximated very well by $$D = [1+(G_1/G_0)^2]^{\frac{1}{2}},$$

and therefore that the weight equation is approximated by $$G_1/G_0 - x \approx (K/D)G_0^2 P_z x - (K/D)(G_1/G_0) + (K/D)x.$$

From this equation it follows that $$x \approx \frac{G_1/G_0}{1 + \frac{K}{D+K} G_0^2 P_z}.$$

Consequently if $G_0^2$ is large the value of x is approximately $$x \approx \left(1 + \frac{D}{K}\right) \frac{G_1}{G_0^3 P_z}.$$

Since $$G_1 - wG_0 = G_0 x \approx \left(1 + \frac{D}{K}\right) \frac{G_1}{G_0^2 P_z}$$

it follows that the signal power in the output is $$P_s \approx \left(1 + \frac{D}{K}\right) \frac{G_1^2}{G_0^2 P_z^2} P_z$$

$$= \left(1 + \frac{D}{K}\right)^2 \frac{G_1^2 G_0^2}{P_z}$$

Consequently, for large input power $P_z$ the signal is suppressed below the noise at the output. This case requires that $|v_7|$ and consequently $|w|$ should be less than the clipping level and therefore that $$G_1/G_0 \leq c.$$

Because in the case of sidelobe jamming the size of the auxiliary antenna is chosen to be such that $$G_1/G_0 \leq 1.$$

it suffices to choose c to be slightly larger than unity, $$c = 1.5,$$

for example, in order to achieve large suppression of strong jammers.

On the other hand if $$|v_7| > c$$

then $$w = cv_7/|v_7|.$$

It is reasonable to restrict attention to the case where $v_7$ is positive so that $$w = c.$$

In that case $$P_s = (G_1 = cG_0)^2 P_z$$

which represents a suppression relative to the input power on the main antenna equivalent to a factor of $$(1 - cG_0/G_1)^2.$$

For the desired signal, $G_1$ is the main antenna gain as modified by fading, and $G_0$ is the auxiliary antenna gain, also as modified by fading. At the median level of the signal $$G_0/G_1 \approx 0.01,$$

and for the value $c = 1.5$ there is negligible signal suppression.

While the invention has been described in one presently preferred embodiment it is understood that the words which have been used are words of description rather than words of limitation and that changes within the purview of the appended claims may be made without departing from the scope or spirit of the invention in its broader aspect.

What is claimed is:

1. In a dual diversity troposcatter link receiver having first and second high gain main antennas and a dual diversity demodulator the improvement residing in a sidelobe jamming suppressor, said sidelobe jamming suppressor comprising
   an auxiliary low gain antenna, and
   a jamming signal suppressor circuit, said jamming signal suppressor circuit comprising
   first, second and third variable attenuators,
   first, second, third, fourth, fifth, sixth seventh, eighth, ninth, tenth, eleventh, twelvth, and thirteenth hybrids,
   first, second and third clippers,
   first, second, third and fourth DC amplifiers,
   first, second, third and fourth low pass filters,
   first, second, third and fourth multipliers,
   first, second, third and fourth mixers,
   first and second amplifiers, and
   first and second limiting amplifiers,
   said first hybrid receiving signals from said auxiliary antenna through said second variable attenuator and feeding said tenth and eleventh hybrids,
   said first and third variable attenuators receiving signals from said first and second main antennas respectively and being connected to said dual diversity demodulator, said first variable attenuator through said second and fourth hybrids and said third variable attenuator through said third and fifth hybrids,
   a first feedback loop fed from said fourth hybrid comprising said first limiting amplifier feeding said eighth hybrid, said eighth hybrid feeding in parallel the series connected arrangement of said first mixer, said first low pass filter, said third DC amplifier, said third clipper and said first multiplier and the series connected arrangement of said third mixer, said second low pass filter, said second DC amplifier, said second clipper, and said SECPND multiplier,
   a second feedback loop fed from said fifth hybrid comprising said second limiting amplifier feeding said ninth hybrid, said ninth hybrid feeding in parallel the series connected arrangement of said second mixer, said third low pass filter, said third DC amplifier, said third clipper and said third multiplier and the series connected arrangement of said fourth mixer, said fourth low pass filter, said fourth DC amplifier, said fourth clipper, and said fourth multiplier,
   said tenth hybrid feeding said first and second mixers through said twelvth hybrid,
   said eleventh hybrid feeding said third and fourth mixers through said thirteenth hybrid,
   the output of said tenth hybrid being fed through said first multipler, said sixth hybrid, said first amplifier and said second hybrid and also through said third multiplier, said seventh hybrid, said second amplifier and said third hybrid, and
   the outputs of said eleventh hybrid being fed through said fourth multiplier, said seventh hybrid, said second amplifier and said third hybrid, and also through said second multiplier, said sixth hybrid, said first amplifier and said second hybrid, said jamming signal suppressor circuit receiving signals from said first and second high gain main antennas and from said auxiliary low gain antenna, said suppressor circuit differencing the signals from each said high gain main antenna with the signal from said low gain auxiliary antenna and inputting the differenced signals to said dual diversity demodulator, the gain of said auxiliary low gain antenna being substantially equal to the sidelobe gain of said high gain main antennor.

2. In a dual diversity troposcatter link receiver a sidelobe jamming suppressor as defined in claim 1 wherein said jamming signal suppresses circuit differences the signals from each said high gain main antenna with a multiple of the signal from said low gain auxiliary antenna.

3. In a dual diversity troposcatter link receiver a sidelobe jamming suppressor as defined in claim 1 wherein the values of said variable attentuators and said clipper are set to provide maximum jamming suppression consistent with minimizing the loss of desired signal when jamming is absent as intermittent.

* * * * *